(12) United States Patent
Meyer et al.

(10) Patent No.: US 9,862,591 B2
(45) Date of Patent: Jan. 9, 2018

(54) FAUCET WITH SHEARING VALVE ELEMENT

(71) Applicant: The Meyer Company, Cleveland, OH (US)

(72) Inventors: Michael H. Meyer, Sagamore Hills, OH (US); Michael A. Kolar, North Royalton, OH (US)

(73) Assignee: The Meyer Company, Cleveland, OH (US)

( * ) Notice: Subject to any disclaimer, the term of this patent is extended or adjusted under 35 U.S.C. 154(b) by 0 days.

(21) Appl. No.: 14/770,318

(22) PCT Filed: Feb. 25, 2014

(86) PCT No.: PCT/US2014/018439
§ 371 (c)(1),
(2) Date: Aug. 25, 2015

(87) PCT Pub. No.: WO2014/131052
PCT Pub. Date: Aug. 28, 2014

(65) Prior Publication Data
US 2016/0009542 A1 Jan. 14, 2016

Related U.S. Application Data

(60) Provisional application No. 61/769,047, filed on Feb. 25, 2013.

(51) Int. Cl.
*B67D 1/14* (2006.01)
*F16K 31/524* (2006.01)
*F16K 1/04* (2006.01)

(52) U.S. Cl.
CPC ......... *B67D 1/1438* (2013.01); *B67D 1/1477* (2013.01); *F16K 1/04* (2013.01); *F16K 31/52408* (2013.01)

(58) Field of Classification Search
CPC ....... B67D 1/1438; B67D 1/1477; F16K 1/04; F16K 31/52408
See application file for complete search history.

(56) References Cited

U.S. PATENT DOCUMENTS 691,569 A   1/1902   Pohlman
772,668 A   10/1904  O'Brien
(Continued)

FOREIGN PATENT DOCUMENTS

GB   2 411 219 B   3/2007

OTHER PUBLICATIONS

International Search Report dated Jun. 16, 2014 for International application No. PCT/US2014/018439.
(Continued)

*Primary Examiner* — Frederick C Nicolas
*Assistant Examiner* — Bob Zadeh
(74) *Attorney, Agent, or Firm* — Fay Sharpe LLP (57) ABSTRACT

A faucet for dispensing liquid with pulp or other suspended solids includes a valve chamber and a valve seat is located in the valve chamber. A valve element for controlling flow of liquid through the valve chamber from the inlet of the body to the outlet of the body includes a valve stem. The valve stem includes (i) a first portion that is closely slidably received in the outlet portion of the liquid flow passage adjacent the valve seat between the valve seat and the outlet; (ii) a second portion connected to the first portion and extending outwardly through the stem aperture of the bonnet such that an outer end of the second portion is located external to the valve chamber; and (iii) a seal located between the first portion and the second portion of the stem. The first portion of the stem cleans the valve seat when the stem moves from the second stem position to the first stem position.

16 Claims, 5 Drawing Sheets

(56) References Cited

U.S. PATENT DOCUMENTS

| | | | |
|---|---|---|---|
| 1,490,227 A | | 4/1924 | Osborn |
| 2,510,393 A | * | 6/1950 | Fraser ............... F16K 31/52408 251/256 |
| 2,745,628 A | * | 5/1956 | Carlson ................ F16K 1/46 251/241 |
| 2,969,923 A | | 1/1961 | Fremion |
| 3,026,907 A | | 3/1962 | Klingler |
| 3,173,579 A | | 3/1965 | Curie et al. |
| 3,415,454 A | | 12/1968 | Bucknell et al. |
| 3,523,549 A | | 8/1970 | Anderson |
| 3,588,040 A | | 6/1971 | Ward |
| 3,763,903 A | | 10/1973 | Ouchterlony |
| 4,040,600 A | | 8/1977 | Coppola et al. |
| 4,381,099 A | | 4/1983 | Knedlik |
| 4,548,343 A | | 10/1985 | Gotch |
| 4,572,411 A | | 2/1986 | Dreibelbis |
| 4,742,851 A | * | 5/1988 | Lundblade ............ B67D 3/045 137/614.12 |
| 4,819,909 A | * | 4/1989 | Hart ..................... F16K 21/06 251/48 |
| 6,908,071 B2 | * | 6/2005 | Roethel ................ F16K 21/06 251/238 |
| RE38,750 E | * | 7/2005 | Weaver ................ F16K 31/566 137/454.6 |
| 2010/0258203 A1 | * | 10/2010 | Meyer .................. F16K 35/025 137/377 |
| 2016/0009542 A1 | * | 1/2016 | Meyer ............... F16K 31/52408 222/505 |

OTHER PUBLICATIONS

Written Opinion dated Jun. 16, 2014 for International application No. PCT/US2014/018439.

International Preliminary Report on Patentability dated Sep. 3, 2015 for International application No. PCT/US2014/018439.

\* cited by examiner

FAUCET WITH SHEARING VALVE ELEMENT

BACKGROUND

This application claims priority from and benefit of the filing date of U.S. provisional application Ser. No. 61/769,047 filed Feb. 25, 2013, and the entire disclosure of said provisional application is hereby incorporated by reference into the present specification.

BACKGROUND

Faucets for dispensing coffee, iced tea, water, and other pulp-free liquids typically use a resilient elastomeric seat cup to control the flow of liquid through the faucet. The seat cup is connected to a valve stem and handle, and a user manually operates the handle to cause the valve stem to pull the nose of the seat cup away from a valve seat to open the faucet for dispensing liquid from an associated urn or other source. When the handle is moved back to its home position, the nose of the seat cup again mates with the valve seat to block further flow of liquid through the faucet. The seat cup is typically spring-biased into engagement with the valve seat.

Use of such faucets with juice containing pulp or other liquids including suspended solids can lead to reduced performance. In particular, the pulp or other suspended solids tend to collect in the region of the valve seat and/or on the seat cup, itself, and reduce the integrity of the seal at the interface between the seat cup and valve seat. This can lead to leakage and a shut-off delay, i.e., an excessive lag between the time the user releases the faucet handle and the actual termination of flow of liquid from the faucet.

Accordingly, a need has been identified for a new and improved faucet particularly adapted to for dispensing pulp-containing juices and other liquids including suspended solids that overcomes these issues.

SUMMARY

In accordance with a first aspect of the present development, a faucet includes a body with an inlet, an outlet, and a liquid flow passage that extends through the body from the inlet to the outlet. A valve chamber is defined in the body between the inlet and the outlet, the valve chamber located between an inlet portion and an outlet portion of said liquid flow passage. The body defines an upper opening that provides access to the valve chamber. A valve seat is located in the valve chamber. A bonnet is secured to the body in covering relation with the upper opening. The bonnet includes a stem aperture. A valve element for controlling flow of liquid through the valve chamber from the inlet of the body to the aid outlet of the body includes a valve stem with: (i) an inner portion that is slidably received in the outlet portion of the liquid flow passage between the valve seat and the outlet; (ii) an outer portion connected to the inner portion and extending outwardly through the stem aperture of the bonnet such that an outer end of the outer portion is located external to the valve chamber; and (iii) a seal located between the inner portion and the outer portion of the stem. A handle is connected to the outer end of the outer portion of the stem and is adapted for manual movement between first and second positions. Movement of the handle from the first position to the second position causes movement of the stem from a first stem position where the seal is engaged with the valve seat to a second stem position in which the seal is separated from the valve seat to allow fluid communication between the valve chamber and the outlet portion of the liquid flow passage. Movement of the handle from the second position to the first position causes movement of the stem from the second stem position to the first stem position in which the seal is engaged with the seat to block fluid communication between the valve chamber and the outlet portion of the liquid flow passage.

In accordance with another aspect of the present development, a faucet for dispensing liquid with suspended solids includes a body with an inlet, an outlet, and a liquid flow passage that extends through the body from the inlet to the outlet. A valve chamber is defined in the body between the inlet and the outlet and is located between an inlet portion and an outlet portion of the liquid flow passage. The body defines an upper opening that provides access to the valve chamber. A valve seat is located in the valve chamber. A bonnet is secured to the body in covering relation with the upper opening and includes a stem aperture. A valve element for controlling flow of liquid through the valve chamber from the inlet of the body to the outlet of the body includes a valve stem. The valve stem includes (i) an inner portion that is closely slidably received in the outlet portion of the liquid flow passage adjacent the valve seat between the valve seat and the outlet; (ii) an outer portion connected to the inner portion and extending outwardly through the stem aperture of the bonnet such that an outer end of the outer portion is located external to the valve chamber; and (iii) a seal located between the inner portion and the outer portion of the stem. A handle is connected to the outer end of the outer portion of the stem and is adapted for manual movement between first and second positions. Location of the handle in the first position corresponds to location of the stem in a first stem position in which the seal is engaged with the seat to block fluid communication between the valve chamber and the outlet portion of the liquid flow passage. Location of the handle in the second position corresponds to location of the stem in a second stem position in which the seal is separated from the valve seat to allow fluid communication between the valve chamber and the outlet portion of the liquid flow passage. The inner portion of the stem moves adjacent and cleans the valve seat when the stem moves from the second stem position to the first stem position.

DETAILED DESCRIPTION OF PRESENT DEVELOPMENT

Figure 1:
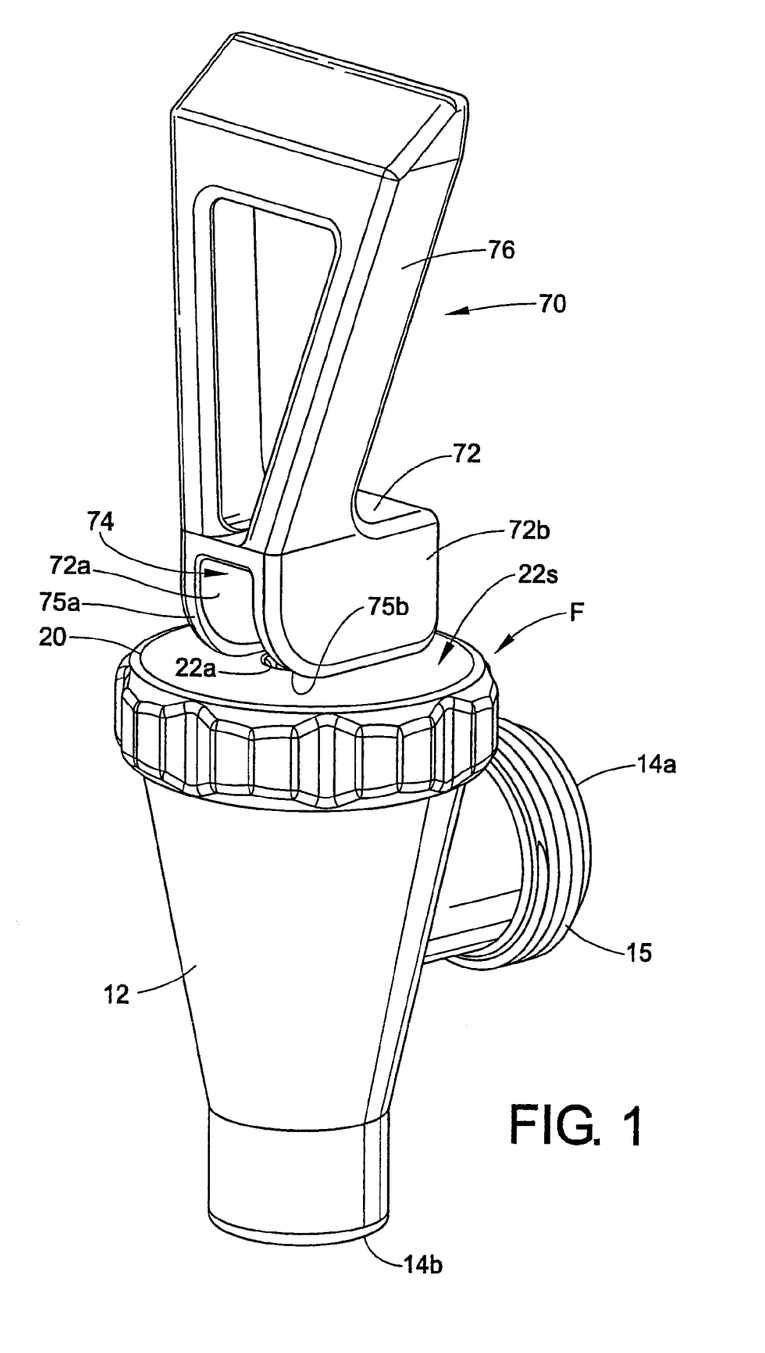
FIG. 1 is an isometric view of a faucet with a shearing valve element formed in accordance with an embodiment of the present development.
Figure 2:
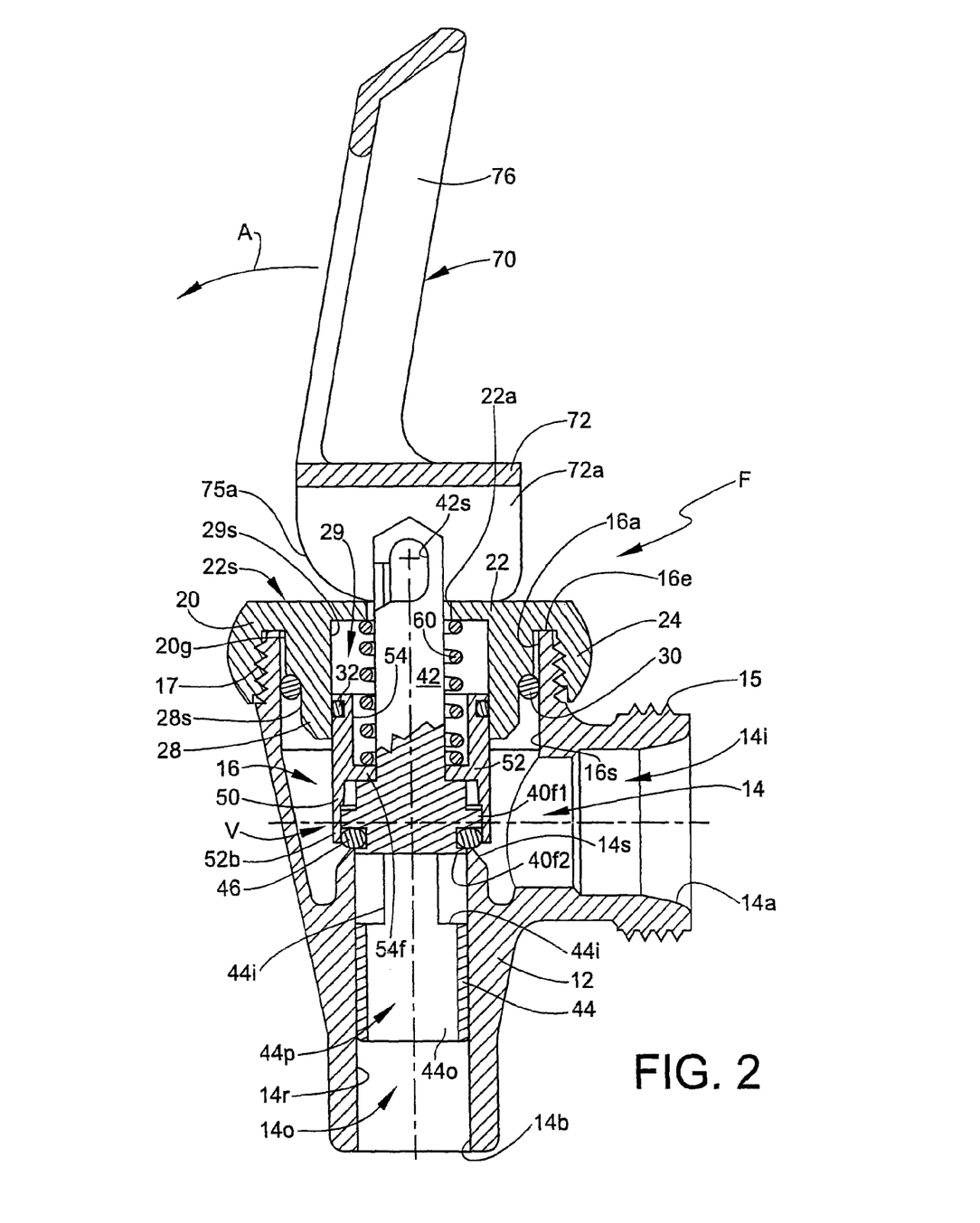
FIG. 2 is a section view of the faucet of FIG. 1 with the valve element in its closed position.
Figure 3:
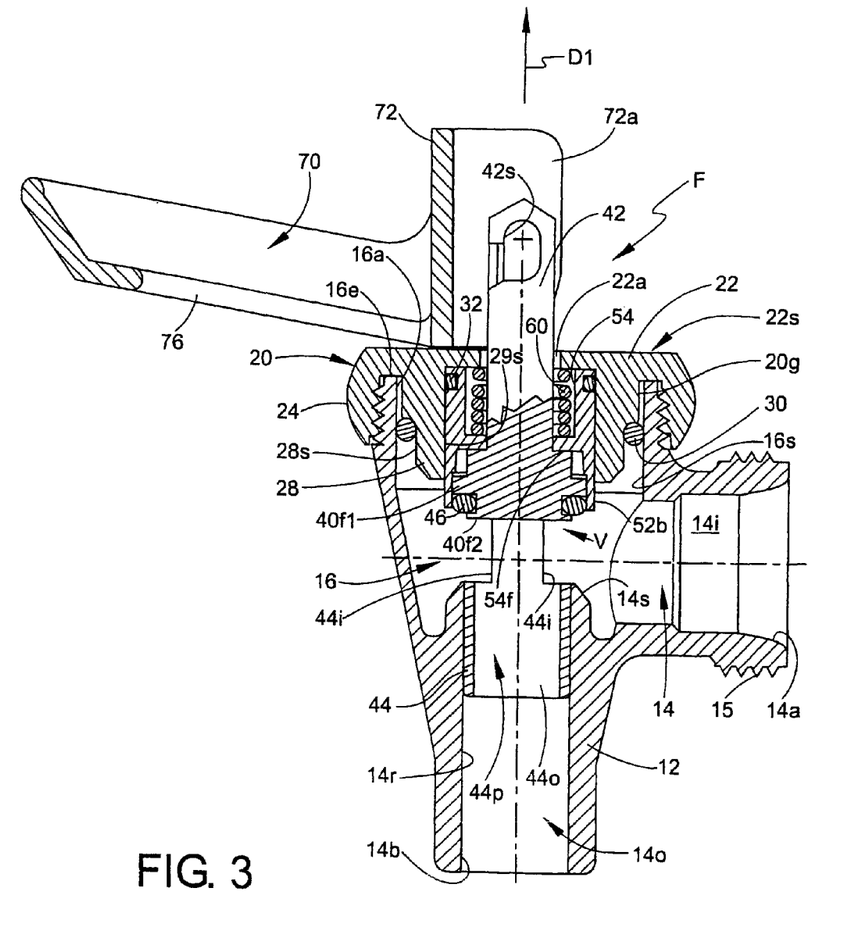
FIG. 3 is a section view similar to FIG. 2 but shows the valve element in an opened position for dispensing liquid.
Figure 4:
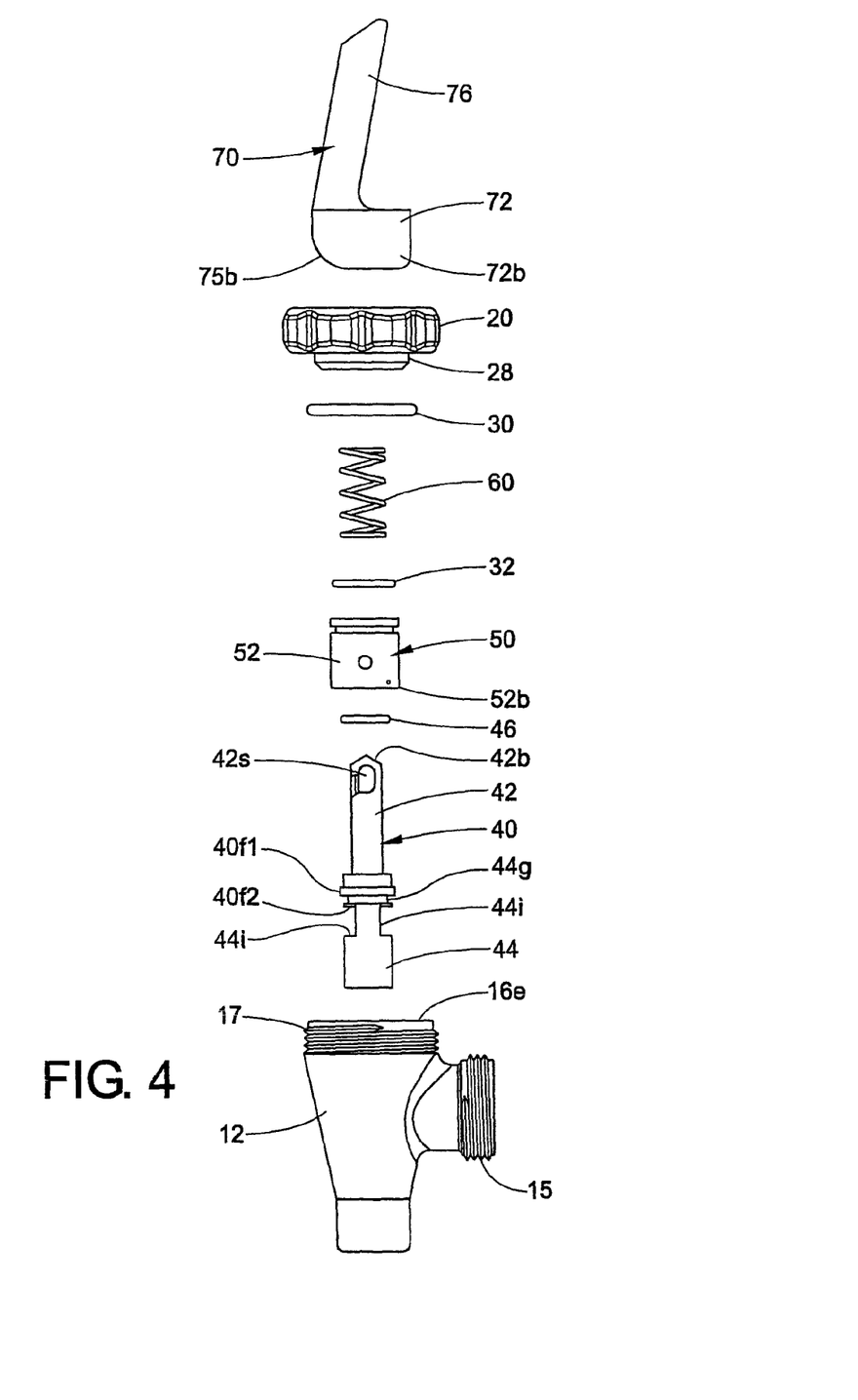
FIG. 4 is an exploded side view of the faucet of FIG. 1.
Figure 5:
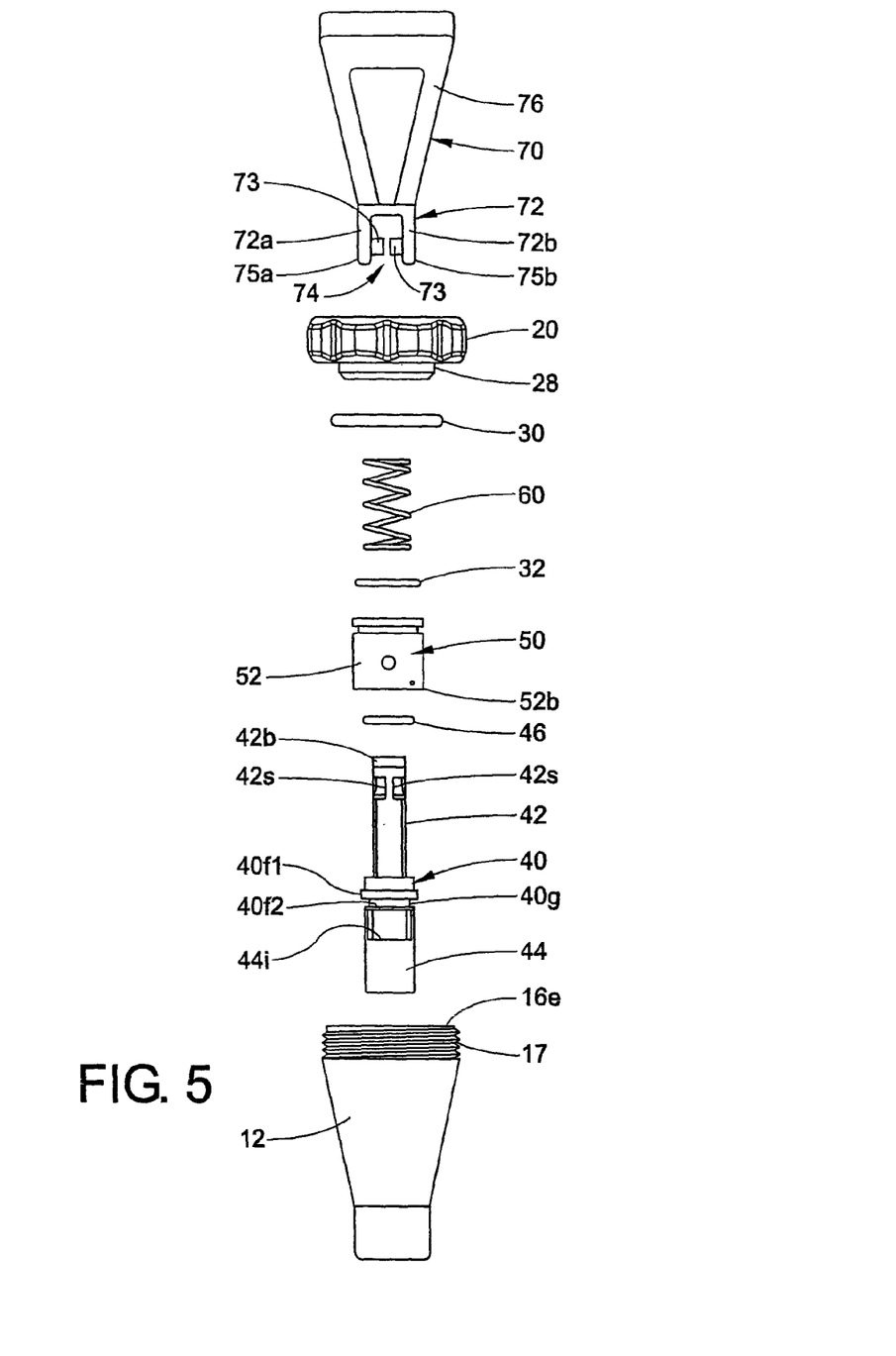
FIG. 5 is an exploded front view of the faucet of FIG. 1.

FIG. 1 is an isometric view of a faucet F with a shearing valve element formed in accordance with the present development. FIG. 2 is a section view of the faucet of FIG. 1 with the valve element V in its closed position, and FIG. 3 is a section view similar to FIG. 2 but shows the valve element V in an opened position for dispensing liquid. FIG. 4 is an exploded side view of the faucet F, and FIG. 5 is an exploded front view of the faucet F.

As shown in FIGS. 1-5, the faucet F comprises a body 12 defining or comprising a liquid flow passage 14 (FIGS. 2 & 3) that extends through the body 12 from an inlet 14a to an outlet 14b. Adjacent the inlet 14a, the body 14 comprises threads 15 or other means such as a nut so that the body 12 is adapted to be secured to an associated urn or other container or structure in which a liquid or other flowable material to be dispensed is contained, e.g., a juice container or urn or other source of juice or other liquid including pulp or other suspended solids.

The body 12 also includes or defines a valve chamber 16 that defines part of the passage 14 between the inlet 14a and outlet 14b. The valve chamber 16 includes an upper opening 16a that opens through the body 12. The faucet body 12 also includes or defines a valve seat 14s that is located in the valve chamber 16 between the inlet 14a and outlet 14b of the passage 14. Access to the valve chamber 16 and valve seat 14s is provided by way of the upper access opening 16a. As such, the valve chamber 16 divides the liquid flow passage 14 into an inlet portion 14i located between the inlet 14a and the valve chamber 16, and an outlet portion 14o located between the valve seat 14s and the outlet 14b.

A valve element V is located in the valve chamber 16 and is adapted to allow and block liquid flow from the inlet 14a to the outlet 14b through the valve chamber 16 by selective engagement with the valve seat 14s. FIG. 2 shows the valve element V in a first or closed position in which it is engaged with the valve seat 14s and blocks flow of liquid through the passage 14 from the inlet 14a to the outlet 14b. FIG. 3 shows the valve element V in a second or opened position in which it is spaced from and disengaged from the valve seat 14s so as to allow flow of liquid through the passage 14 from the inlet 14a to the outlet 14b past the valve seat 14s. The structure and operation of the valve element V is described in further detail below.

A bonnet 20 is secured to the body 12 in covering relation with upper opening 16a of valve chamber 16 to close the valve chamber 16 and secure and capture the valve element V in its operative position inside the valve chamber 16. As shown, the bonnet 20 comprises a one-piece polymeric or metal cap structure or, alternatively, a two-piece or multi-piece polymeric and/or metallic structure, that includes a main wall 22 having a peripheral lip 24 with internal threads for mating with external threads 17 located on the body 12 adjacent the upper opening 16a of the valve chamber 16. The main wall 22 of the bonnet 20 covers and closes the upper opening 16a of the body 12 when the bonnet 20 is operatively installed on the body 12 as shown. The main wall 22 of the bonnet 20 comprises a planar outer surface 22s. A valve stem aperture 22a opens through the main wall 22.

On the underside or inside of the main wall 22, the bonnet 20 comprises a projection or boss 28 that projects from the main wall 22 into the valve chamber 16. At least part of the boss 28 is defined to be cylindrical or conical or otherwise so as to have a circular cross-section. The peripheral lip 24 of the bonnet 20 is spaced radially outward from and is concentric with the boss 28 such that an annular groove 20g is defined between the boss 28 and the peripheral lip 24. When the bonnet 20 is installed on the body 12, the circular edge 16e of the body 12 defining the upper opening 16a is located in the groove 20g. An outer bonnet seal 30 such as an O-ring seal or the like is located on an outer surface 28s of the boss 28, e.g., in a depression or groove as shown, and sealingly engages an inner surface 16s of the body 12 that defines an upper portion of the valve chamber 16 and that is cylindrical or otherwise shaped so as to have a circular cross-section. The outer bonnet seal 30 prevents escape of liquid between the inner surface 16s of the valve chamber 16 and the bonnet 20.

The boss 28 of the bonnet 20 also comprises a cylindrical internal bore 29 including an inner cylindrical surface 29s. The stem aperture 22a of the bonnet main wall 22 opens into the cylindrical bore 29.

As noted above, the valve element V controls the flow of liquid through the valve chamber 16. The valve element V comprises a valve stem 40. As may be seen in FIGS. 2-5, the valve stem 40 includes: a first or outer portion comprising an elongated rod or shank 42; and, a second or inner hollow cylindrical body or portion 44 that is closely and slidably received in a cylindrical bore portion 14r of the outlet passage 14o. The cylindrical portion 44 of the stem 40 comprises an internal stem flow passage 44p and also comprises at least one and preferably first and second stem flow passage inlets 44i that open through the outer wall of the cylindrical portion 44 and that are in fluid communication with the internal stem flow passage 44p. The stem passage 44p also comprises an outlet 44o that opens into the outlet passage 14o of the faucet body 12. As such, liquid is able to flow from the first and second stem flow passage inlets 44i into the stem flow passage 44p and flows out of the stem flow passage 44p via stem flow passage outlet 44o into the body outlet passage 14o for being dispensed through the faucet body outlet 14b.

Between the elongated shank 42 and the inner hollow cylindrical portion 44, the valve stem 40 comprises an annular groove 40g (FIGS. 4 & 5) in which a valve seal 46 such as an O-ring or the like is seated. The annular groove 40g is defined between upper and lower radial flanges 40f1, 40f2 of the valve stem 40. When the valve stem 40 is in its first or closed position as shown in FIG. 2, the valve seal 46 is engaged with the valve seat 14s and blocks the flow of liquid past the valve seat 14s into the stem flow passage 44p via first and second stem flow passage inlets 44i. When the valve stem 40 is in this first or closed position, the first and second stem flow passage inlets 44i are located in the outlet bore 14r downstream from the valve seat 14s between the valve seat 14s and the outlet 14b of the body 12. As such, in this closed position of the valve V, liquid cannot flow into the stem flow passage 44 via inlets 44i and cannot otherwise flow past the valve seat 14s toward the outlet 14b of the faucet body 12.

Referring to FIG. 3, the stem 40 is selectively manually movable to a second or opened position in which the stem 40 is pulled upward or outward in a first direction D1 relative to the outlet bore 14r so that the valve seal 46 is moved away from and unseated from the valve seat 14s. In this second or opened position of the valve stem 40, the first and second stem flow passage inlets 44i are moved to a position in which they are at least partially withdrawn from the outlet bore 14r so as to be located above (upstream relative to) the valve seat 14s so that liquid contained in the valve chamber 16 flows into the first and second stem flow passage inlets 44i and flows through the stem flow passage 44 and out of the faucet body 12 through the outlet bore 14r and outlet 14b. The flow rate of liquid from the valve chamber 16 into the valve stem flow passage 44 is controllable by varying the distance in which the valve stem 40 is moved in the direction D1 in order to control the percentage of the stem flow passage inlets 44i that extend above the valve seat 14s. FIG. 3 shows the valve stem 40 moved a maximum distance in the direction D1 so that approximately 100% of the stem flow passage inlets 44i are located above the valve seat 14s.

As noted, the annular groove 40g in which the valve seal 46 is seated is bounded on one side by the lower radial flange 40f2. This lower flange 40f2 supports the valve seal 46 and is located closer to the valve seat 14s as compared to the upper flange 40f1. As shown in FIG. 2, the lower radial flange 40f2 is dimensioned to fit closely within the valve seat and inside the outlet bore 14r of the outlet passage 14o adjacent the valve seat 14s with minimal clearance. As such, the lower radial flange 40f2 supports the valve seal 46 without interfering in the engagement of the valve seal 46 with the valve seat 14s. Also, when the valve stem 40 moves from an opened position (FIG. 3) to its closed position (FIG. 2), the lower radial flange 40f2 serves as a shear and severs or dislodges any pulp or other solids that are located where the valve seat 14s meets the outlet bore 14r and/or any pulp or solids that are trapped on the valve seat 14s and extend into the outlet bore. This shearing action of the lower radial flange 40f2 helps to ensure that the valve seal 46 is able to mate with the valve seat 14s in a fluid tight manner without interference from pulp or other solids even after extended use of the faucet.

The valve element V further comprises a sleeve or cup 50 defined separately from but positioned coaxially on the stem 40. Alternatively, the cup 50 can be defined as one-piece with the stem 40. The cup 50 comprises a cylindrical cup body 52 including a central passage 54 through which the shank portion 42 of the valve stem 40 extends. The cup further comprises an internal flange 54f that extends radially inward from the cup body 52 into the central passage 54. On a first or lower side, the internal flange 54f is abutted with (or connected to) the stem 40. The opposite, upper side of the internal flange 54f provides a reaction surface for a spring such as a coil spring 60 that is coaxially positioned on the stem shank 42. A first or inner end of the spring 60 is abutted with the upper side of the internal flange 54f and an opposite second or outer end of the spring 60 is abutted with the inside face of the bonnet main wall 22. The spring 60 thus biases the cup 50 and stem 40 away from the bonnet main wall 22 in a second direction opposite the first direction D1. The cup body 52 is dimensioned to fit closely and slidably within the cylindrical bore 29 of the boss 28 with minimal clearance. An inner bonnet seal 32 is carried in a annular groove of the cup body 52 and sealingly engages the cup body 52 with the cylindrical surface 29s defining the bore 29 to prevent passage of liquid between the cup body 52 and the cylindrical surface 29s of the boss 28 while still allowing the cup body 50 to slide in the bore 29 in the direction D1 and the opposite direction. The cup body 52 includes a lower portion 52b that extends over the upper flange 40f1 of the stem 40 so as to project axially over the valve seal groove 40g and the valve seal 46 located therein. As such, the lower portion 52b of the cup body 52 radially constrains and prevents outward radial movement of the valve seal 46 when the valve seal 46 engages the valve seat 14s when the valve element V is closed. The spring 60 continuously biases the valve stem 40 in a second direction opposite the first direction D1 toward its first or closed position and biases the valve seal 46 into continuous engagement with the valve seat 14s when the valve element V is closed.

The faucet F further comprises a handle 70 that is operatively secured to an outer end 42b of the valve stem shank 42 with a pivoting connection. In the illustrated example, the handle is pivotally secured to the outer end 42b of the valve stem shank 42 with a pivoting snap-fit connection, but a pin or other pivoting connection can alternatively by used. The handle 70 includes a base 72 that is pivotally connected to the stem shank 42 and an upper portion 76 by which the handle 70 is manually pivoted by a user when the user desires to dispense liquid from the faucet F. The handle base 72 comprises parallel spaced-apart first and second cam walls 72a,72b that define a channel 74 there between into which the outer end 42b of the valve stem shank 42 is received. As shown in FIG. 5, the first and second cam walls 72a,72b include respective lugs 73 that project toward each other into the channel 74. Also shown in FIG. 5, the outer end 42b of the valve stem shank 42 includes first and second pivot slots 42s into which the mating lugs 73 of the handle 70 are received to establish the pivoting connection of the handle 70 to the valve stem shank 42. Pivoting movement of the handle 70 on an arc in direction A (FIG. 2) from its first position of FIG. 2 to its second position of FIG. 3 causes curved cam surfaces 75a,75b of the respective cam walls 72a,72b to bear against the outer surface 22s of the bonnet main wall 22 such that handle 70 pulls the stem 40 outward through the bonnet stem aperture 22a in the direction D1 so that the valve seal 46 is lifted away from the valve seat 14s against the biasing force of the spring 60 to open the valve element V so that liquid flows through the faucet flow passage 14 from the faucet body inlet 14a to the faucet body outlet 14b through the valve chamber 16. Release of the handle 70 and/or reverse movement of the handle 70 in a direction opposite the direction A allows spring 60 to urge the stem 40 back toward the valve seat 14s in the second direction opposite the first direction D1 until the valve seal 46 again mates with the valve seat 14s to close the valve element V. As noted above, the lower flange 40f2 of the stem 40 cleans the valve seat 14s by severing and/or dislodging any pulp or other solids located at the interface where the valve seat 14s meets the outlet passage 14o and/or outlet bore 14r. The stem 40 can alternatively or additionally include another structure for engaging the valve seat 14s during movement of the stem 40 in order to clean the valve seat 14s by severing and/or dislodging debris from the valve seat 14s and adjacent surfaces.

Modifications and alterations will occur to those of ordinary skill in the art to which the invention pertains upon reading and understanding this specification. It is intended that the claims be construed as encompassing all such modifications and alterations to the maximum possible consistent with maintaining the validity of the present invention.

The invention claimed is:
1. A faucet comprising:
   a body comprising an inlet, an outlet, and a liquid flow passage that extends through the body from said inlet to said outlet;
   a valve chamber defined in said body between said inlet and said outlet, said valve chamber located between an inlet portion and an outlet portion of said liquid flow passage, said body defining an upper opening that provides access to said valve chamber;
   a valve seat located in said valve chamber;
   a bonnet secured to said body in covering relation with said upper opening, said bonnet including a stem aperture;
   a valve element for controlling flow of liquid through said valve chamber from said inlet of said body to said outlet of said body, said valve element comprising a valve stem including:
      (i) an inner portion that is slidably received in said outlet portion of said liquid flow passage between said valve seat and said outlet; and,
      (ii) an outer portion connected to said inner portion and extending outwardly through said stem aperture of said bonnet such that an outer end of the outer portion is located external to said valve chamber;
(iii) a seal located between said inner portion and said outer portion of said valve stem;
a handle connected to said outer end of said outer portion of said valve stem and adapted for manual movement between first and second positions, wherein:
movement of said handle from said first position to said second position causes movement of said valve stem from a first stem position where said seal is engaged with said valve seat to a second stem position in which said seal is separated from said valve seat to allow fluid communication between said valve chamber and said outlet portion of said liquid flow passage; and,
movement of said handle from said second position to said first position causes movement of said valve stem from said second stem position to said first stem position in which said seal is engaged with said seat to block fluid communication between said valve chamber and said outlet portion of said liquid flow passage;
said valve stem comprising upper and lower radial flanges and an annular groove defined between said upper and lower radial flanges, wherein said seal is located in said annular groove, said lower flange is located outside said outlet portion of said liquid flow passage when said valve stem is located in the second stem position and said lower flange is closely received inside said outlet portion of said liquid flow passage adjacent said valve seat when said valve stem is located in the first stem position such that upon movement of said valve stem from the second stem position to the first stem position, said lower flange is adapted to dislodge associated debris from the valve seat as the lower flange moves into said outlet portion of said liquid flow passage.

2. The faucet as set forth in claim 1, wherein said valve stem further comprises:
a stem passage defined in said inner portion and in fluid communication with said outlet portion of said liquid flow passage of said body; and,
a first stem passage inlet defined through a wall of said inner portion of said valve stem and in fluid communication with said stem passage;
wherein said first stem passage inlet is in fluid communication with said valve chamber when said valve stem is located in said second stem position.

3. The faucet as set forth in claim 2, further comprising a second stem passage inlet defined through said wall of said inner portion and in fluid communication with said stem passage;
wherein said second stem passage inlet is in fluid communication with said valve chamber when said valve stem is located in said second stem position.

4. The faucet as set forth in claim 2, wherein said inner portion of said valve stem comprises a cylindrical body in which said stem passage is defined, said cylindrical body comprising an outer wall in which said first stem passage inlet is defined.

5. The faucet as set forth in claim 1, wherein said seal comprises an O-ring seal seated in said annular groove.

6. The faucet as set forth in claim 1, wherein said stem aperture of said bonnet is defined in a main wall, said bonnet further comprising a boss that projects from said main wall into said valve chamber, and said faucet further comprises an outer bonnet seal located between said boss and an inner surface of said body that defines the upper opening of said valve chamber.

7. A faucet comprising:
a body comprising an inlet, an outlet, and a liquid flow passage that extends through the body from said inlet to said outlet;
a valve chamber defined in said body between said inlet and said outlet, said valve chamber located between an inlet portion and an outlet portion of said liquid flow passage, said body defining an upper opening that provides access to said valve chamber;
a valve seat located in said valve chamber;
a bonnet secured to said body in covering relation with said upper opening, said bonnet including a stem aperture;
a valve element for controlling flow of liquid through said valve chamber from said inlet of said body to said outlet of said body, said valve element comprising a valve stem including:
(i) an inner portion that is slidably received in said outlet portion of said liquid flow passage between said valve seat and said outlet; and,
(ii) an outer portion connected to said inner portion and extending outwardly through said stem aperture of said bonnet such that an outer end of the outer portion is located external to said valve chamber;
(iii) a seal located between said inner portion and said outer portion of said valve stem;
a handle connected to said outer end of said outer portion of said valve stem and adapted for manual movement between first and second positions, wherein:
movement of said handle from said first position to said second position causes movement of said valve stem from a first stem position where said seal is engaged with said valve seat to a second stem position in which said seal is separated from said valve seat to allow fluid communication between said valve chamber and said outlet portion of said liquid flow passage; and,
movement of said handle from said second position to said first position causes movement of said valve stem from said second stem position to said first stem position in which said seal is engaged with said seat to block fluid communication between said valve chamber and said outlet portion of said liquid flow passage;
wherein said stem aperture of said bonnet is defined in a main wall, said bonnet further comprising a boss that projects from said main wall into said valve chamber, and said faucet further comprises an outer bonnet seal located between said boss and an inner surface of said body that defines the upper opening of said valve chamber;
said boss of said bonnet comprising an internal bore defined by a cylindrical surface and said stem aperture opens into said internal bore;
said faucet further comprising:
a cup comprising a cylindrical cup body positioned coaxially about said outer portion of said valve stem, said cup body comprising a central passage through which said outer portion of said valve stem extends and including an internal flange that is abutted with said valve stem;

a spring coaxially positioned about said outer portion of said valve stem between said bonnet and said internal flange that biases said valve stem toward said first stem position; and, an inner bonnet seal located between said cup body and said cylindrical surface that defines said internal bore of said bonnet boss.

8. The faucet as set forth in claim 7, wherein said cylindrical cup body comprises a lower portion that extends over said upper flange of said valve stem and engages said valve seal to radially constrain said valve seal when said valve seal engages said valve seat.

9. A faucet for dispensing liquid with suspended solids, said faucet comprising:
a body comprising an inlet, an outlet, and a liquid flow passage that extends through the body from said inlet to said outlet;
a valve chamber defined in said body between said inlet and said outlet, said valve chamber located between an inlet portion and an outlet portion of said liquid flow passage, said body defining an upper opening that provides access to said valve chamber;
a valve seat located in said valve chamber;
a bonnet secured to said body in covering relation with said upper opening, said bonnet including a stem aperture;
a valve element for controlling flow of liquid through said valve chamber from said inlet of said body to said outlet of said body, said valve element comprising a valve stem including:
  (i) an inner portion that is closely slidably received in said outlet portion of said liquid flow passage adjacent said valve seat between said valve seat and said outlet;
  (ii) an outer portion connected to said inner portion and extending outwardly through said stem aperture of said bonnet such that an outer end of the outer portion is located external to said valve chamber;
  (iii) a seal located between said inner portion and said outer portion of said valve stem;
a handle connected to said outer end of said outer portion of said valve stem and adapted for manual movement between first and second positions, wherein:
  location of said handle in said first position corresponds to location of said valve stem in a first stem position in which said seal is engaged with said seat to block fluid communication between said valve chamber and said outlet portion of said liquid flow passage;
  location of said handle in said second position corresponds to location of said valve stem in a second stem position in which said seal is separated from said valve seat to allow fluid communication between said valve chamber and said outlet portion of said liquid flow passage;
  wherein said inner portion of said valve stem moves adjacent and cleans said valve seat when said valve stem moves from said second stem position to said first stem position;
said valve stem comprising upper and lower radial flanges and an annular groove defined between said upper and lower radial flanges, wherein said seal is located in said annular groove, said lower flange is located outside said outlet portion of said liquid flow passage when said valve stem is located in the second stem position and said lower flange is closely received inside said outlet portion of said liquid flow passage adjacent said valve seat when said valve stem is located in the first stem position such that upon movement of said valve stem from the second stem position to the first stem position, said lower flange is adapted to dislodge associated debris from the valve seat as the lower flange moves into said outlet portion of said liquid flow passage.

10. The faucet as set forth in claim 9, wherein said valve stem further comprises:
a stem passage defined in said inner portion and in fluid communication with said outlet portion of said liquid flow passage of said body; and,
a first stem passage inlet defined through a wall of said inner portion and in fluid communication with said stem passage;
wherein said first stem passage inlet is in fluid communication with said valve chamber when said valve stem is located in said second stem position.

11. The faucet as set forth in claim 10, further comprising a second stem passage inlet defined through said wall of said inner portion and in fluid communication with said stem passage;
wherein said second stem passage inlet is in fluid communication with said valve chamber when said valve stem is located in said second stem position.

12. The faucet as set forth in claim 10, wherein said inner portion of said valve stem comprises a cylindrical body in which said stem passage is defined, said cylindrical body comprising an outer wall in which said first stem passage inlet is defined.

13. The faucet as set forth in claim 9, wherein said seal comprises an O-ring seal seated in said annular groove.

14. The faucet as set forth in claim 9, wherein said stem aperture of said bonnet is defined in a main wall, said bonnet further comprising a boss that projects from said main wall into said valve chamber, and said faucet further comprises an outer bonnet seal located between said boss and an inner surface of said body that defines the upper opening of said valve chamber.

15. The faucet as set forth in claim 14, wherein said boss of said bonnet comprises an internal bore defined by a cylindrical surface and said stem aperture opens into said internal bore, said faucet further comprising:
a cup comprising a cylindrical cup body positioned coaxially about said outer portion of said valve stem, said cup body comprising a central passage through which said outer portion of said valve stem extends and including an internal flange that is abutted with said valve stem;
a spring coaxially positioned about said outer portion of said valve stem between said bonnet and said internal flange that biases said valve stem toward said first stem position;
an inner bonnet seal located between said cup body and said cylindrical surface that defines said internal bore of said bonnet boss.

16. The faucet as set forth in claim 15, wherein said cylindrical cup body comprises a lower portion that extends over said upper flange of said valve stem and engages said seal to radially constrain said seal when said seal engages said valve seat.

* * * * *